United States Patent Office 2,774,936
Patented Dec. 18, 1956

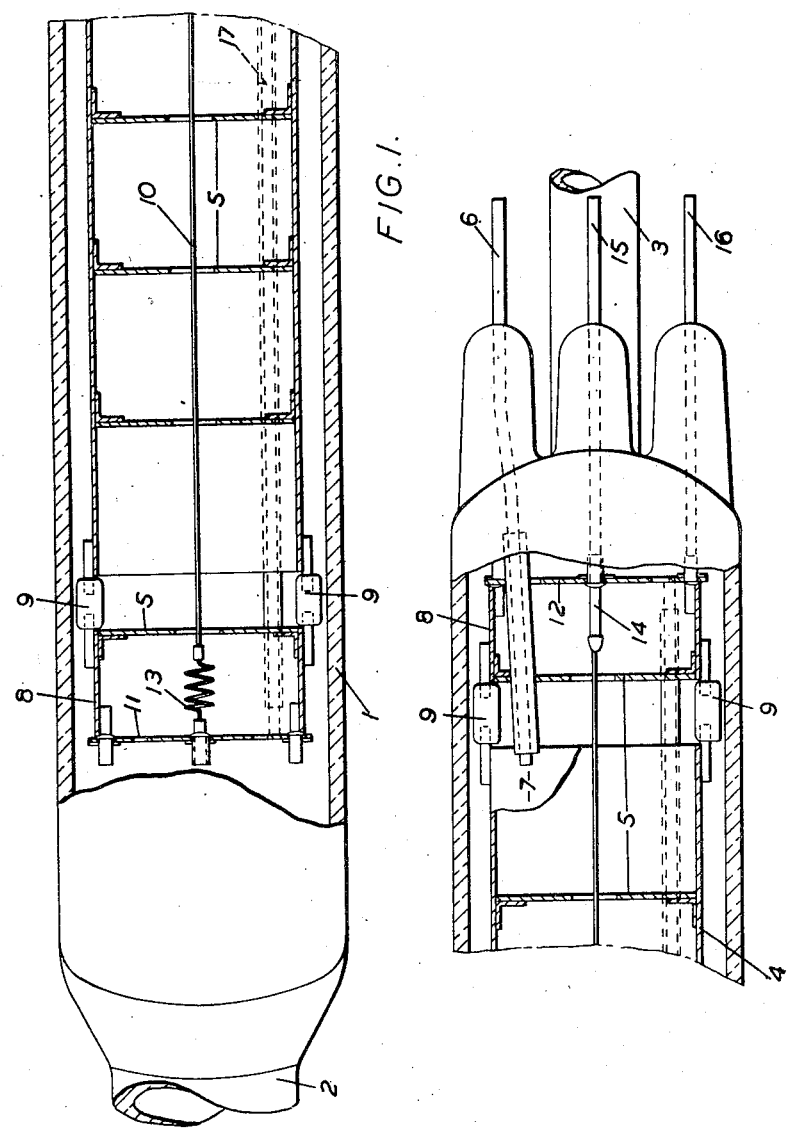

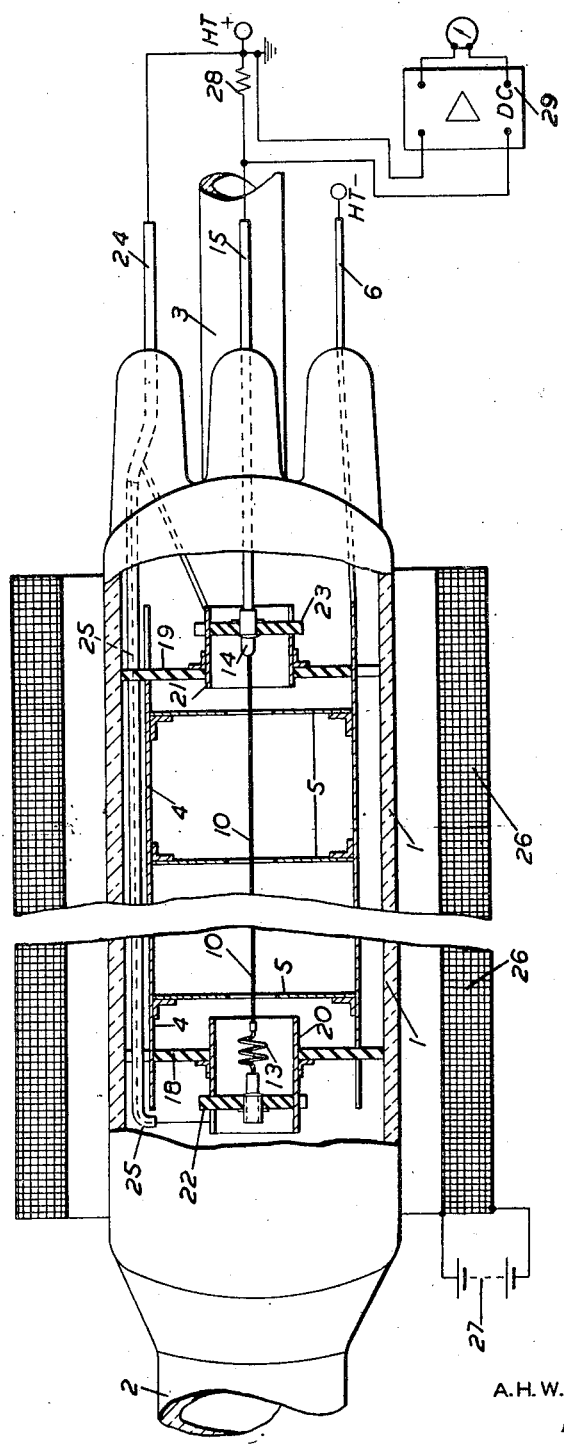

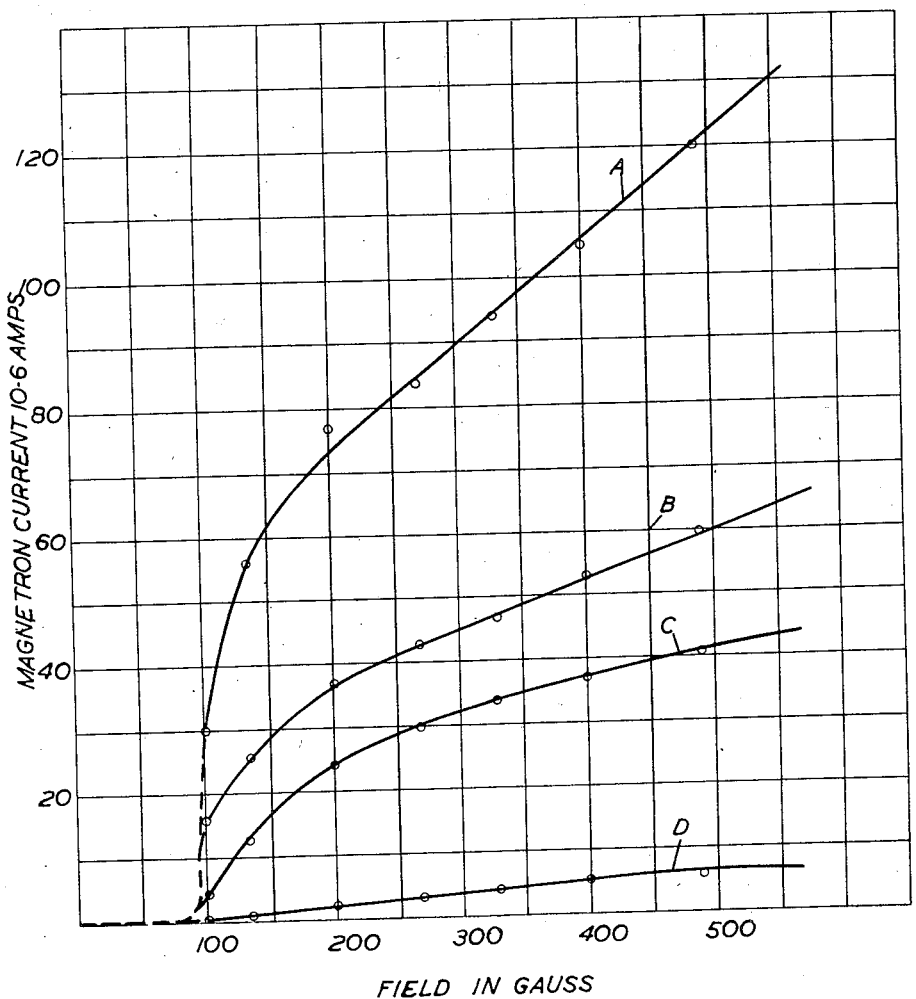

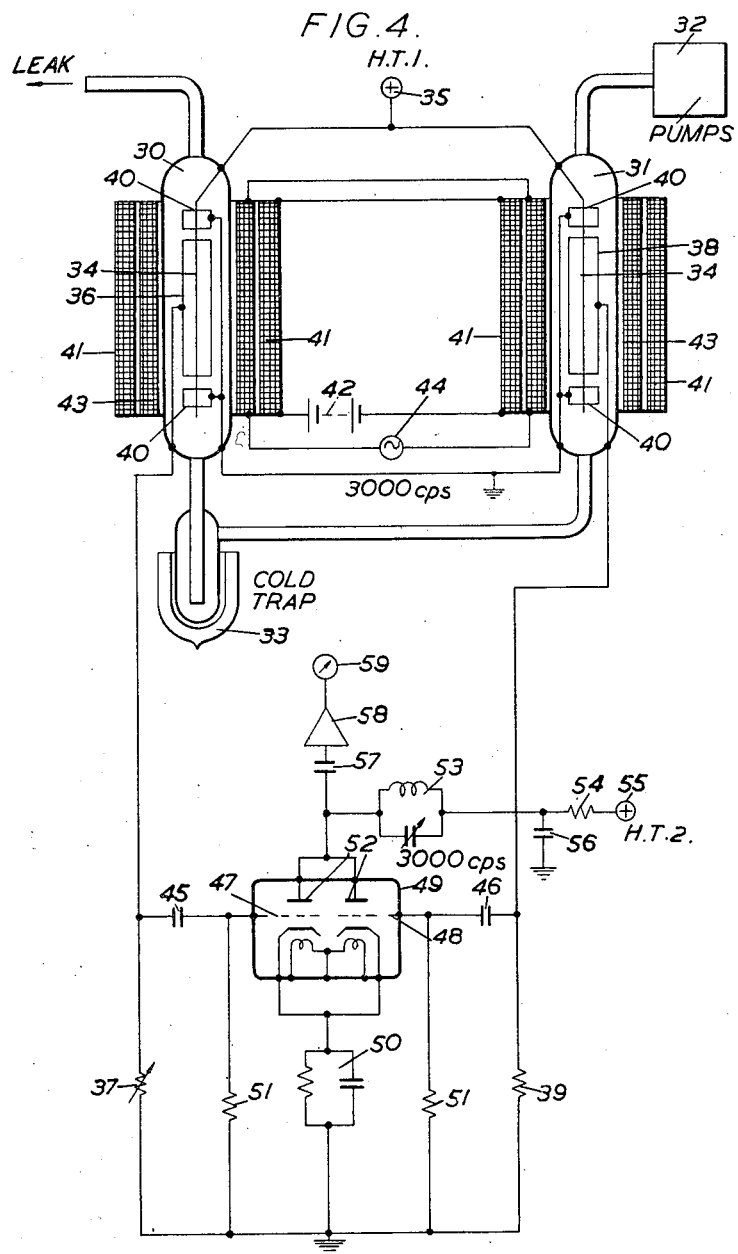

2,774,936

IONISATION MANOMETERS

Arnold Hugh William Beck and Alan Douglas Brisbane, London, England, assignors to International Standard Electric Corporation, New York, N. Y.

Application July 27, 1953, Serial No. 370,550

Claims priority, application Great Britain July 29, 1952

4 Claims. (Cl. 324—33)

The present invention relates to ionisation manometers and is particularly concerned with gauges of the magnetron type disclosed in our U. S. application Serial No. 278,466, filed March 25, 1952.

Our U. S. application No. 278,466 describes and claims an arrangement for estimating the degree of vacuum in a low pressure system comprising a vessel in communication with the said system; an elongated anode and surrounding cold cathode electrode within the vessel; field emission surfaces protruding inwardly from the cathode electrode; means, including the provision of a magnetic field axially of the anode and cathode electrodes, for causing electrons emitted from the said surfaces to follow helicoidal paths about the said axis; and means for measuring changes of current flowing between the said anode and cathode electrodes.

The said application also describes and claims an ionisation manometer tube comprising an elongated anode electrode surrounded by a non-magnetic cold cathode electrode, and transverse metallic baffle plates, joined to the said cathode electrode, dividing the enclosure within the cathode into chambers communicating one with another through respective central orifices surrounding the anode electrode. Preferably the cathode is cylindrical and the anode is a fine wire supported axially in tension between insulating washers locating the anode with respect to the cathode.

In accordance with the present invention, there is provided an arrangement for estimating the degree of vacuum in a low pressure system, or for measuring and/or detecting leaks in a said system, comprising: a vessel in communication with the system; an elongated anode and a surrounding cold cathode electrode within the vessel; field emission surfaces protruding inwardly from the cathode electrode intermediate the ends thereof; means, including the provision axially of the anode and cathode electrodes of a magnetic field whose intensity is varied rhythmically for causing electrons emitted from the said surfaces to follow helicoidal paths about said axis; and measuring means depending upon the alternating component of current flowing between the said anode and cathode electrodes.

As stated above, embodiments of the parent invention utilised a fine wire anode spaced from the surrounding cathode by means of insulating washers. We have found that, although the manometer tube need not be critically dimensioned in other respects, the anode wire must be accurately maintained coaxial with the surrounding cathode cylinder. It follows that independent means for locating the cathode and anode electrodes within the tube envelope are not to be advocated. On the other hand, leakage across the insulator supporting the anode wire within the cathode is liable to be a disturbing factor in use. According to a further feature of the present invention, the effect of this leakage is countered by the provision of guard electrodes and there is provided an ionisation manometer tube comprising: a glass envelope adapted to communicate with an enclosure whose degree of vacuum is to be measured or which it is desired to test for leaks; an anode electrode in the form of a fine wire surrounded by a cylindrical cold cathode electrode of non-magnetic material; transverse metal baffle plates, joined to the said cathode electrode dividing the enclosure within the cathode into chambers communicating one with another through respective central orifices surrounding the anode electrode, the said anode being supported in tension at each end by insulating means comprising two insulating portions separated by a guard electrode so that the guard electrode is in series with the leakage path from anode to cathode across the said insulating means.

In one form of embodiment the guard electrode comprises cylindrical extensions of the cathode insulated therefrom, the anode wire being supported from insulators secured to the guard electrodes. In another form of embodiment, the guard electrodes surround the anode wire at either end within the cathode and provide supports for washers between which the anode wire is held in tension, the guard electrodes being located with respect to the cathode cylinder by further insulating washers.

The tube of the present invention provides, therefore, in use, an arrangement for estimating the degree of vacuum in a low pressure system or for measuring and/or detecting leaks in a said system, comprising: a vessel in communication with the system; an elongated anode and a surrounding cold cathode electrode within said vessel; field emission surfaces protruding inwardly from the cathode electrode intermediate the ends thereof; means, including the provision of a magnetic field axially of the anode and cathode electrodes, for causing electrons emitted from the said surfaces to follow helicoidal paths about the said axis; and means for measuring changes of current flowing between the said anode and cathode electrodes, the measuring means comprising means for amplifying the voltage or voltage change across a load resistor, the said anodes being mounted by insulating means between a pair of guard electrodes and the guard electrodes being positioned by further insulating means locating the anode in respect to the cathode, the said guard electrodes being connected to one end of the said load resistor so as to by-pass leakage currents between anode and cathode.

The present invention is particularly advantageous in a differential leak detection system, using a pair of the magnetron ionisation gauges, preferably constructed with guard electrodes, one gauge communicating directly with the system under test and the other communicating with the system through an absorbing filter such as a liquid air cold trap. A suitable probe gas of high molecular weight, such as butane, which is absorbed by the filter, is used for searching for the leak. When the probe gas enters the system through any leak, the output from one of the manometer tubes increases rapidly, while the other, being protected by filter, is not affected by the probe gas, its output, rather, being reduced because some of the air which previously entered the tube via the leak is now replaced by the probe gas. The two tubes may conveniently be connected in an A. C. bridge arrangement the output of which provides a measure of the magnitude of the leak.

The invention will be described with reference to the accompanying drawings, in which:

Fig. 1 shows an embodiment of a manometer tube according to the invention, incorporating guard electrodes, Fig. 2 shows an alternative form of the manometer tube and the method of connection of the guard electrodes, Fig. 3 shows curves illustrating the variation of manometer tube anode current with magnetic field for various degrees of vacuum, and Fig. 4 shows a leak detection arrangement according to the invention.

The tube illustrated in Fig. 1, which is adapted to be inserted in series with the main gas path of the vacuum system, comprises an envelope 1 having tubulations 2 and 3 at either end for communication with the system under test. The electrode assembly comprises a cylindrical cathode 4 of non-magnetic material, such as "Ferry" (registered trademark) having a number of transverse baffles 5, each centrally apertured. A lead 6 sealed through the envelope 1 is connected to the cathode at 7, where, in Fig. 1, part of the cathode is shown cut away. At either end of the cathode cylindrical guard rings 8, of the same diameter as the cathode, are supported from the cathode end by means of glass beads 9. A tungsten wire anode 10 is supported between insulating washers 11 and 12, secured to the respective guard electrodes 8, a spring support 13 being provided at one end to maintain the wire in tension, a rigid support 14 being provided at the other. A lead 15 sealed through the envelope is connected to the support 14 to serve as an anode connection, and a third lead 16, also sealed through the envelope is joined to both the guard electrodes, an internal glass-shrouded connecting lead 17, indicated by dotted lines in Fig. 1, joining the two guard electrodes together.

In a typical embodiment, the cathode is 0.787 inch internal diameter and 3 inches long, the baffles 5 are placed 0.6 inch apart and are provided with central apertures $\frac{3}{16}$ inch in diameter. The edges of the baffles are preferably left sharp, the more readily to provide field emission therefrom, and the anode wire is 0.002 inch in diameter. It is found that none of the above dimensions is critical, but the sensitivity of the tube is adversely affected if the anode wire is more than a few thousandths of an inch off the axis of the cathode cylinder and baffle apertures.

In Fig. 2 we show only the end sections of a tube similar to that of Fig. 1 but having an alternative guard electrode construction. In this construction a pair of insulating washers 18 and 19, mounted in the ends of the cathode 4, and, if desired, locating the same with respect to the envelope wall 1, carry respective guard rings 20 and 21 coaxial with the cathode. The guard ring 20 mounts a further insulating washer 22, to which is secured the spring 13 supporting one end of the anode wire 10. Similarly the guard electrode 21 carries an insulating washer 23 which carries the rigid support 14 for the anode wire. A lead 24 sealed through the glass envelope is connected to guard ring 21 and, via the glass-shrouded connection 25, to guard ring 20. A solenoid 26, energised by means illustrated conventionally as a battery 27, surrounds the tube in use. A load resistor 28 is connected between the anode lead 15 and the positive terminal of a source of high tension supply the positive terminal being grounded. A D. C. measuring equipment, represented by the amplifier 29, is connected across load resistor 28. The lead 24 from the guard electrodes is connected to ground and the cathode cylinder 4 is connected to the negative terminal of the H. T. supply. Any variation in anode current produces a corresponding variation in the voltage across resistor 28, and hence variation of the voltage applied to the D. C. amplifier 29. Any leakage across the insulators 18, 19, 22 and 23 does not affect the measurement, for the leakage path, which, in the absence of the guard electrodes, would appear directly between anode and cathode, is now intercepted by the guard electrodes and behaves merely as a shunt across the H. T. supply by-passing the measuring equipment.

The performance of the ionisation manometer tube is shown in graphical form in Fig. 3, in which the ordinates represent anode current in microamperes and the abscissae give the field strength of the D. C. magnetic field in gauss.

The four curves shown relate to the following pressures within the low pressure system, an anode supply of 6 kv. and a load resistor of 1 M$\Omega$ being used.

Curve A _____ $3.8 \times 10^{-6}$ mm. Hg
Curve B _____ $2.3 \times 10^{-6}$ mm. Hg
Curve C _____ $1.5 \times 10^{-6}$ mm. Hg
Curve D _____ $3.5 \times 10^{-7}$ mm. Hg From these curves it will be apparent that if an alternating magnetic field be superimposed upon the steady magnetic field, the anode current at any given pressure will vary in accordance with the A. C. field and maximum A. C. output will be obtained at low values of the D. C. field component.

A method of use of the invention for the detection of leaks in vacuum apparatus is illustrated in Fig. 4, in which two similar ionisation tubes 30 and 31 are inserted in series between the system under test, denoted by the legend "Leak" and vacuum pumps 32. A cold trap 33 is inserted in series between the tubes 30 and 31. Each of the tubes is represented as having an anode 34 taken to a terminal 35, labelled HT1, for connection to a 6 kv. supply. The cathode 36 of tube 30 is connected to ground through variable load resistor 37, while the cathode 38 of tube 31 is connected to ground through fixed resistor 39. The guard electrodes 40 of each tube are connected to ground, so that the direct leakage paths across the insulators between anode and cathode appear merely as shunts across the H. T. supply and do not affect the measurements. Two solenoids are indicated surrounding each tube, windings 41 being connected to a D. C. supply indicated as a battery 42, while the windings 43 are connected to a source 44 of alternating current, which may conveniently be of a frequency around 3000 cycles per second. The A. C. modulating windings 43 should be connected so that when the flux along the axis of tube 30 is increasing, that along the axis of tube 31 is decreasing. The cathodes 35 and 37 are connected through respective D. C. blocking capacitors 45 and 46 to the grids 47 and 48 of a double triode amplifier tube 49. The cathodes of this tube are commoned and are connected to ground through a self-bias circuit 50, the grids 47 and 48 being connected to ground for D. C. purposes through the usual grid resistors 51. The two anodes 52 are strapped together and connected through a tuned circuit 53, adjusted to the frequency of the source 44, and de-coupling resistor 54 to terminal 55, labelled H. T. 2, of a 300 volt supply. The tuned circuit 52 is grounded for A. C. through capacitor 56, while the voltage developed across the tuned circuit is fed through capacitor 57 to an amplifier 58 whose output is shown feeding a meter 59.

The operation of the arrangement of Fig. 4 is as follows: Assuming that it is wished to investigate the vacuum system for leaks, the circuit is balanced by adjustment of resistor 37. If air is entering the system, it will affect both tubes 30 and 31 similarly, so that their outputs will be approximately the same, but because of the reversed polarity of the modulating windings 43 the voltage appearing on the grids of tube 49 will be in opposition and hence, after adjustment of resistor 37, there will be no output to the amplifier 58. Butane, or other gas which will liquify in the cold trap 33, is sprayed over the exterior of the apparatus where the leaks are suspected. Should any butane enter the low pressure system through a leak the high collision cross section of the butane molecules entering tube 30 will increase the frequency of collisions of the electrons emitted from the cathode so that discharge current will increase and the voltage across resistor 37 will also increase. The butane flowing through tube 30 is liquified in the cold trap 33, and so does not enter the tube 31, the operation of which therefore is, if anything, reduced because less gas reaches it than before, the butane having replaced some of the air previously entering the system. An output therefore appears on meter 59. To determine the magnitude of a leak, the reading of meter 59 may be calibrated in terms of known leaks through standard capillary tubes.

In the arrangement of Fig. 4 the load resistors 37 and 39 are connected in the cathode circuit of the tubes 30 and 31. The guard electrodes 40 of these tubes, therefore, are connected to ground and the tube may conveniently be of the construction shown in Fig. 1. On the other hand, because the anodes are thin wires, and their capacitance to ground is much less than that of the cathodes, it may be preferable to have the load resistors as part of the anode circuits instead of the cathode circuits. In this case the load resistors are connected between anodes 34 and H. T. 1 and the cathodes 36 and 38 are grounded, while the guard electrodes are connected direct to the H. T. 1 terminal. With such an arrangement the tube of Fig. 2 may be more suitable.

While the principles of the invention have been described above in connection with specific embodiments, and particular modifications thereof, it is to be clearly understood that this description is made only by way of example and not as a limitation on the scope of the invention.

What we claim is:

1. An ionisation manometer tube comprising: a glass envelope adapted to communicate with an enclosure whose degree of vacuum is to be measured or which it is desired to test for leaks; an anode electrode in the form of a fine wire surrounded by a cylindrical cold cathode electrode of non-magnetic material; transverse metal baffle plates, joined to the said cathode electrode, dividing the enclosure within the cathode into chambers communicating one with another through respective central orifices surrounding the anode electrode, the said anode being supported in tension at each end by insulating means comprising two insulating portions separated by a guard electrode so that the guard electrode is in series with the leakage path from anode to cathode across the said insulating means and a separate lead-in through the envelope to said guard electrode.

2. An arrangement for estimating the degree of vacuum in a low pressure system or for measuring and/or detecting leaks in a said system, comprising: a vessel in communication with the system; an elongated anode and a surrounding cold cathode electrode within the said vessel; field emission surfaces protruding inwardly from the cathode electrode intermediate the ends thereof; means, including the provision of a magnetic field axially of the anode and cathode electrodes, for causing electrons emitted from the said surfaces to follow helicoidal paths about the said axis; and means for measuring changes of current flowing between the said anode and cathode electrodes, the measuring means comprising means for amplifying the voltage or voltage change across a load resistor, the said anodes being mounted by insulating means between a pair of guard electrodes and the guard electrodes being positioned by further insulating means locating the anode in respect to the cathode, the said guard electrodes being connected to one end of the said load resistor so as to by-pass leakage currents between anode and cathode.

3. An ionisation manometer tube according to claim 1 in which the said guard electrodes are cylindrical members insulatingly supported by, and extending beyond the respective ends of the cathode, the said anode wire being supported by insulating washers mounted in the respective cylindrical members.

4. An ionisation manometer tube according to claim 1, in which the said guard electrodes comprise a pair of cylinders surrounding the respective ends of the anode wire, an insulating washer mounted within each guard electrode supporting one end of the anode wire and a further insulating washer surrounding the guard electrode supporting the same within the cathode.

References Cited in the file of this patent

UNITED STATES PATENTS

| | | |
|---|---|---|
| 2,081,429 | Gaede | May 25, 1937 |
| 2,200,909 | Berghaus et al. | May 14, 1940 |
| 2,457,781 | Metten et al. | Dec. 28, 1948 |
| 2,490,468 | Picard | Dec. 6, 1949 |
| 2,560,952 | Herold | July 17, 1951 |
| 2,576,330 | Beringer | Nov. 27, 1951 |
| 2,622,208 | Bernstein et al. | Dec. 16, 1952 |
| 2,648,818 | Cohen | Aug. 11, 1953 |
| 2,652,716 | Blears et al. | Sept. 22, 1953 |

FOREIGN PATENTS

| | | |
|---|---|---|
| 555,134 | Great Britain | Aug. 5, 1943 |